United States Patent [19]

Ando et al.

[11] 4,013,339
[45] Mar. 22, 1977

[54] OPTICAL IMAGE STABILIZING SYSTEM

[75] Inventors: Kunio Ando, Warabi; Takemi Saito, Kawagoe, both of Japan

[73] Assignee: Fuji Photo Optical Co., Ltd., Omiya, Japan

[22] Filed: Mar. 21, 1974

[21] Appl. No.: 453,489

[30] Foreign Application Priority Data

May 18, 1973  Japan .............................. 48-54674

[52] U.S. Cl. .................. 350/16; 356/149; 356/248; 352/140; 354/70
[51] Int. Cl.² ........................................ G02B 23/02
[58] Field of Search ........... 350/16; 356/149, 248, 356/250; 354/70; 352/140, 243

[56] References Cited

UNITED STATES PATENTS

| | | | |
|---|---|---|---|
| 1,586,070 | 5/1926 | Cooke | 354/70 |
| 1,628,776 | 5/1927 | Henderson | 350/16 X |
| 2,959,088 | 11/1960 | Rantsch | 350/16 X |
| 3,409,350 | 11/1968 | Call | 350/16 X |
| 3,424,522 | 1/1969 | Call | 350/16 X |
| 3,434,771 | 3/1969 | Alvarez | 350/16 |
| 3,459,473 | 8/1969 | Call | 352/140 |
| 3,608,995 | 9/1971 | Humphrey | 350/16 |
| 3,608,996 | 9/1971 | Humphrey | 350/16 |

*Primary Examiner*—David H. Rubin
*Attorney, Agent, or Firm*—Fleit & Jacobson

[57] ABSTRACT

In an optical instrument such as a camera or a telescope, a first optical component is mounted to a housing and an inertially stabilized second optical component for compensation is mounted on gimbals. The gimbals are provided with an electric motor which has a rotor in the form of an annular magnet rotatably supported with the axis of rotation aligned with the optical axis of the optical instrument. The rotor serves as an inertial member to inertially stabilize the second optical component for compensation.

11 Claims, 10 Drawing Figures

OPTICAL IMAGE STABILIZING SYSTEM

BACKGROUND OF THE INVENTION

Cross Reference to Related Applications

This application relates to subject matter similar to that disclosed in co-pending U.S. application Ser. No. 453,440 filed concurrently herewith by the present inventors.

Field of the Invention

This invention relates to an image stabilizing optical system, and more specifically to an optical system in which the optical image obtained thereby is stabilized against accidental angular deviation of the optical system. This invention is applicable to a photographic camera or a telescope. Further, the image stabilizing optical system in accordance with the present invention is applicable to an afocal optical system which keeps its exit optical axis stabilized with respect to the optical axis of an optical instrument combined therewith against vibration or accidental motion thereof. Such an afocal optical system can be used in combination with a camera to prevent the vibration of the image focused by the camera.

This invention is further applicable to an optical system for transmitting a laser beam. A laser transmitter is required to be stable in transmitting a laser beam. The optical stabilizing system in accordance with the present invention is useful in stabilizing the laser beam against accidental motion of the laser transmitter.

Description of the Prior Art

It is well known that the optical image obtained by an optical instrument including an image focusing optical system is susceptible to deterioration by accidental angular deviation or vibration of the instrument. Such accidental angular deviation or vibration of the optical instrument occurs when the instrument is held by hand or carried in a vehicle. Since the optical image is usually magnified by enlargement in cameras and by the eyepiece in telescopes, the vibration or deterioration of the image is conspicuous in the optical instrument. In a laser transmitter or other optical instrument used in communication, the angular deviation of the instrument caused by accidental motion or vibration of the instrument is a great problem.

In view of the above-described problems inherent in optical instruments, there have been developed a variety of optical stabilization systems for preventing the accidental motion of an optical instrument from causing deterioration of the optical image in the optical instrument. Most of the optical stabilization systems which have heretofore been commercially available are of the type in which an optical element of the optical instrument is mounted to a gyroscopically controlled mechanism of complicated construction. Owing to the complicated construction of such a mechanism, the conventionally available optical stabilization systems have been expensive and impractical. No practical and effective optical stabilizing system has yet been put into use or made available.

In more detail, one type of conventionally available optical image stabilizing systems has one or the other of a pair of positive and negative lenses mounted to an inertial mechanism like a gyroscope and the pair of the positive and negative lenses is made into an optical wedge or a liquid prism is used as an optical wedge. In such an optical image stabilizing system, the optical elements can be arranged in a line and accordingly the construction of the optical system can be made simple. The construction of the mechanism for operating the system, however, becomes very complicated. In the well-known Dynalens optical system employing a liquid lens, for instance, a gyroscope and two servo-mechanisms are necessitated. In an optical system employing a set of positive and negative lenses working as an optical wedge wherein the negative lens is mounted to a housing and the positive lens is mounted to a rotor of the gyroscope and the position of the positive lens is stabilized by the inertia of the gyroscope, a complicated mechanism is necessitated to constantly associate the rotor with the driving shaft of a motor since the rotor of the gyroscope is rotatably mounted to the housing by means of gimbal support construction.

Another type of conventionally available optical image stabilizing system has a mirror or a reflecting prism mounted to an inertial mechanism like a gyroscope. This type of the optical image stabilizing system is simple in construction in comparison with the above-mentioned type of the system. However, this type of the stabilizing system suffers from the defect that the optical elements cannot be arranged in a line and accordingly the construction of the optical system becomes complicated.

SUMMARY OF THE INVENTION

In view of the above-mentioned defects inherent in the conventionally available optical image stabilizing systems, the primary object of the present invention is to provide an improved optical image stabilizing system in which the optical elements can be arranged in a line and an optical element can be mounted to an inertial mechanism by a simple means.

Another object of the present invention is to provide an optical image stabilizing system which can be adapted to a photographic camera wherein a positive lens and a negative lens are made into an afocal lens system to be located in front of the taking lens of the camera and the light rays emanating from the afocal lens system are stabilized with respect to the optical axis of the camera against accidental angular deviation of the system.

Still another object of the present invention is to provide an optical image stabilizing system which can be adapted for use in a telescope wherein the image viewed through the eyepiece of the telescope is stabilized against accidental deviation of the telescope.

A further object of the present invention is to provide an optical image stabilizing system in which the hollow rotor of a motor serving as the inertial member is mounted to gimbals with the axis of rotation of the rotor aligned with the optical axis of the optical instrument so that the whole size of the optical instrument may be made compact and the optical elements may be arranged in a line through said rotor.

As briefly stated in the foregoing abstract, the image stabilizing system in accordance with the present invention employs an electric motor mounted to gimbals, and the rotor of the motor is provided with a hole or transparent portion for transmitting light therethrough so that the whole construction of the system may be made compact in size and simple in construction. The stator of the motor is mounted on gimbals and an optical element, such as an erect prism, used to compensate for the deviation of the optical instrument is mounted on the gimbals. The erect prism used for the above purpose has its incident light optical axis and its emanating light optical axis on a common straight line.

Further, in accordance with an embodiment of the present invention the weight of the optical system including the image stabilizing means in accordance with the present invention is decreased by reducing the weight of the bearing which supports the rotor. In this embodiment, the rotor is formed of an annular magnet core and a support member having a shaft which is rotatably supported by small bearings and annular core is mounted around said support member. The support member is made of transparent material or arms which have a small cross-sectional area so that the light may pass therethrough. In accordance with this embodiment, the load on the motor when it rotates the rotor is decreased.

DESCRIPTION OF THE PREFERRED EMBODIMENTS

Figure 1:
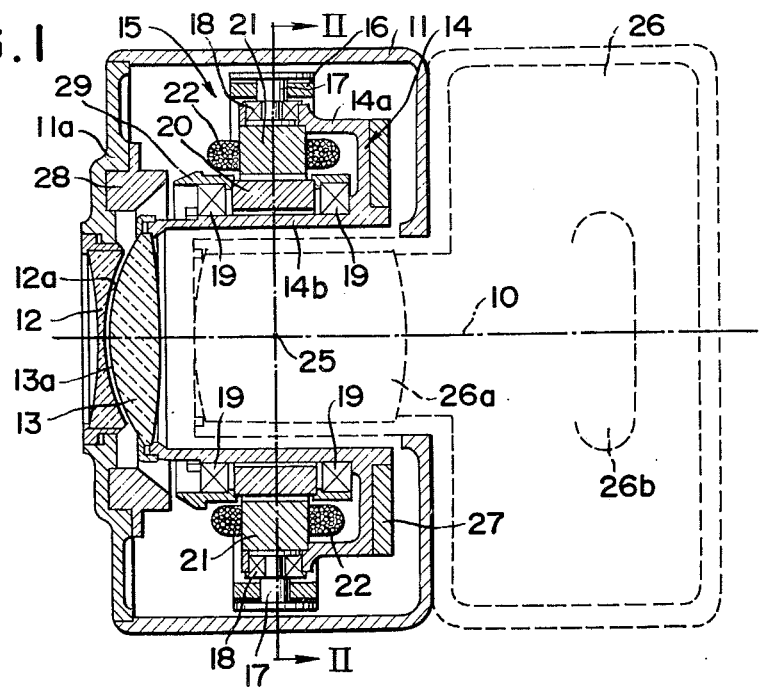
FIG. 1 is a longitudinal sectional elevation of an embodiment of the optical image stabilizing system in accordance with the present invention embodied in an afocal lens system adapted to be used with a photographic camera or the like, FIG. 2 is a cross-sectional view of the optical image stabilizing system shown in FIG. 1 taken along the line II—II.
Figure 2:
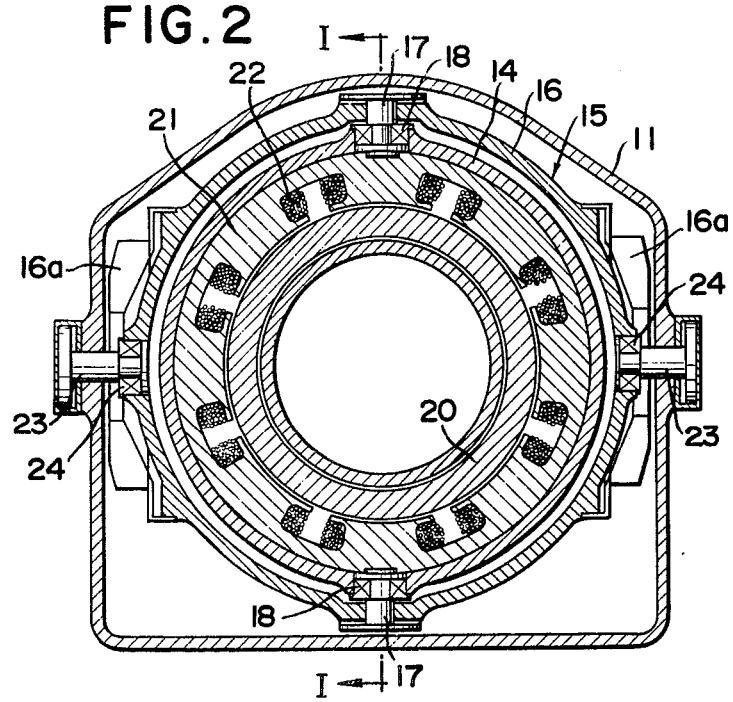

One preferred embodiment of the present invention is illustrated in FIGS. 1 and 2 in which a photographic camera is shown in broken lines and the image stabilizing system adapted for use with the camera is shown in solid lines. The image stabilizing system incorporated two optical elements and gimbals disposed within a light-tight housing 11. The light-tight housing 11 has a front lens frame 11a to which a negative lens 12 is mounted. A positive lens 13 is located just behind the negative lens 12 to constitute an afocal lens system together therewith. The positive lens 13 is mounted to an inner ring 14 of gimbals 15. The gimbals 15 comprises an outer ring 16 and the inner ring 14. The inner ring 14 is rotatably mounted to the outer ring 16 by means of a pair of trunnions 17 and bearings 18. The inner ring 14 has an outer cylindrical portion 14a and an inner cylindrical portion 14b extending around the optical axis 10 of the afocal optical system 12 and 13 and in coaxial relationship with each other. The front end of the inner cylindrical portion 14b is provided with said positive lens 13, and the outer surface of the inner cylindrical portion 14b is provided with a pair of parallel annular ball bearings 19. An annular magnetic core 20 serving as an inertial rotor is rotatably mounted on the bearings 19 so as to be rotated around the inner cylindrical portion 14b of the inner ring 14 of gimbals 15. Said outer cylindrical portion 14a of the inner ring 14 of gimbals 15 is provided on the inner surface thereof with an annular stationary core 21 serving as a stator which constitutes an electric motor together with said rotor 20. The stator 21 is provided with coils 22. As shown in FIG. 2, the outer ring 16 of gimbals 15 is rotatably mounted to the housing 11 by means of a pair of trunnions 23 and bearings 24.

The negative lens 12 is a double-concave lens and the positive lens 13 located adjacent to the negative lens 12 is a double-convex lens as shown in FIG. 1, and the second surface 12a of the negative lens 12 and the first surface 13a of the positive lens 13 have substantially the same curvature. The center of curvature of the surfaces 12a and 13a is at the center of rotation of the gimbals 15 indicated at 25 in FIG. 1.

The negative lens 12 is fixed to the light-tight housing 11 and the positive lens 13 is mounted to gimbals 15. Therefore, the negative lens 12 is inclined together with the housing 11 and the positive lens 13 keeps its position inertially against the inclination or deviation of the housing 11. Consequentlly, the emanating light optical axis of the afocal system is stabilized with respect to the optical axis of an optical instrument associated therewith regardless of the inclination or deviation of the housing 11 of the optical image stabilizing system. This system can be, therefore, used as an optical axis stabilizing device for a laser beam. Further, as shown in FIG. 1, this system can be adapted to a photographic camera 26 having an objective lens 26a and a photographic film 26b on the focal plane thereof for preventing the vibration of the image focused on the film 26b even if the camera is subject to mechanical vibrations.

The inner ring 14 is provided with a balance weight 27 to compensate for the weight of the motor and the positive lens 13. The lens frame 11a is provided with a magnet 28 around the negative lens 12 and the magnet core 20 mounted on the inner ring 14 is provided with an annular aluminium member 29 extending close to the magnet 28 so that the rotation of the magnet core 20 and accordingly the annular aluminium member 29 made in the vicinity of the magnet 28 may cause an eddy current resistance therebetween and result in a precession effect to make the gimbals 15 follow a large motion of the housing 11. As shown in FIG. 2, the outer ring 16 is further provided with a pair of dampers 16a for preventing undesirable vibration of the gimbals 15.

In accordance with the above-described embodiment of the present invention, in which a rotor of an electric motor having a hollow portion enclosing the optical axis of the optical system is mounted to gimbals and rotated at a high speed, the optical element mounted to gimbals is inertially stabilized against accidental motion of the housing having another optical element. Therefore, it is possible in accordance with the present invention to manufacture an optical instrument of simple construction and small size which has an optical system comprising optical elements arranged optically in a line and stabilizes an optical image or an optical axis.

In the above-described embodiment of the invention, it will be understood that the positive lens 13 which has been described to be mounted to the inner ring 14 of gimbals 15 may be mounted to the rotor 20 of the motor. Further, the rotor 20 of the motor may be rotated around the stator 21. Further, it is of course possible to interchange the position of the positive lens 13 and the negative lens 12 by bringing the center of rotation 25 of gimbals 15 to a point in front of the lens system.

Figure 3:
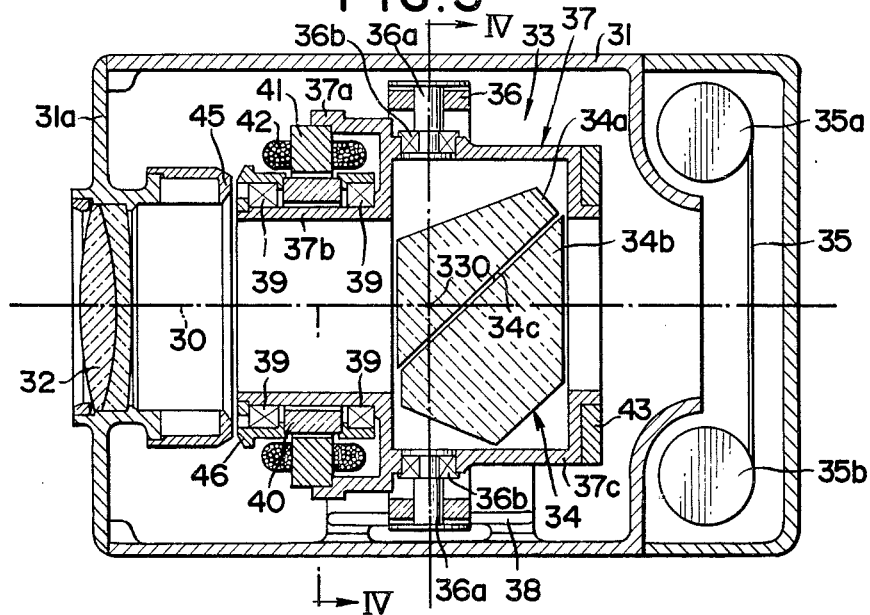
FIG. 3 is a longitudinal sectional elevation of another embodiment of the optical image stabilizing system in accordance with the present invention embodied in a camera.
Figure 4:
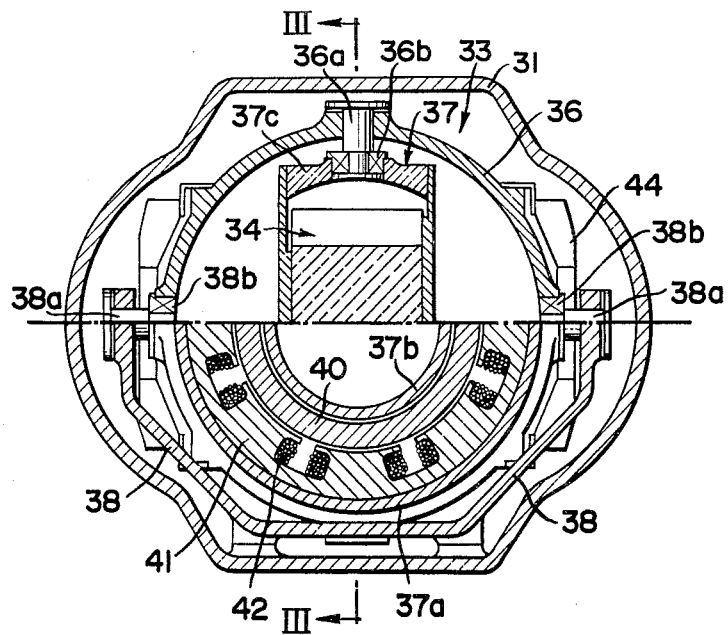
FIG. 4 is a cross-sectional view of the optical image stabilizing system shown in FIG. 3 taken along the line IV—IV.

Another embodiment of the present invention embodied in a photographic camera is illustrated in FIGS. 3 and 4. An objective lens 32 is mounted to a lens frame 31a of a light-tight housing 31. Within the light-tight camera housing 31 is provided gimbals 33 on which an erect prism 34 is mounted. Behind the erect prism 34 on the focal plane of the objective lens 32 is placed a photographic film 35 tensioned between a feed-out spool 35a and a take-up spool 35b. The erect prism 34 and the film 35 are positioned along the optical axis 30 of the objective lens 32 of the camera. The incident light optical axis of the erect prism 34 is in alignment with the emanating light optical axis of the erect prism 34. The erect prism of such a type as shown in FIG. 3 is known as a Pechan prism. The center of rotation 330 of gimbals 33 is at the middle point of the path from the objective lens 32 to the film 35. Precisely speaking, the center of rotation of gimbals 33 is determined to be at the middle point of the path from the secondary principal point of the objective lens to the focal point thereof. The gimbals 33 is mounted to the camera housing 31 so as to inertially support the erect prism 34 against the accidental motion of the camera housing 31 and accordingly against the motion of the objective lens 32 and the film 35. In such an optical system as described hereinabove, the optical image focused on the photographic film is stabilized against the deviation or motion of the camera housing 31. The principle of the stabilization of the optical image by the above-described optical system is described in detail in a copending patent application filed by the same applicants (Ser. No. 453,440, filed Mar. 21, 1974). The construction of the image stabilizing system in accordance with this embodiment is advantageous in that the erect prism mounted to the inner ring of gimbals counterbalances the magnet cores of the motor mounted to gimbals. Now the construction of this embodiment will be described in detail referring to FIGS. 3 and 4.

The gimbals 33 are mounted to the camera housing 31. The gimbals 33 comprises an outer ring 36 and an inner ring 37 rotatably connected with each other by means of a pair of trunnions 36a and bearings 36b. The outer ring 36 is rotatably supported by support arms 38 by means of a pair of shafts 38a and bearings 38b. The inner ring 37 has a forwardly extending outer cylindrical portion 37a and a forwardly extending inner cylindrical portion 37b. The outer and inner cylindrical portions 37a and 37b are in parallel to each other. The outer surface or periphery of the inner cylindrical portion 37b is provided with a pair of parallel annular bearings 39. An annular magnetic core 40 serving as a rotor is rotatably mounted on the bearings 39 and the outer cylindrical portion 37a of the inner ring 37 is provided with an annular stationary core 41 serving as a stator. The stationary core 41 is provided with coils 42. The stator 41 with the coils 42 and the rotor 40 constitute an electric motor. The rotor 40 serves as an inertial member to inertially stabilize the inner ring 37 of gimbals 33. The rearwardly extending portion 37c of the inner ring 37 is provided with the erect prism 34 such as a Pechan prism comprising a first prism block 34a and a second prism block 34b assembled together to have a narrow parallel air space 34c. The incident light optical axis of the erect prism 34 is in alignment with the emanating light optical axis of the erect prism 34. The center of rotation 330 of gimbals 33 is located at the middle point of the path from the secondary principal point of the objective lens 32 to the focal point of the lens 32. The light entering the camera housing 31 through the objective lens 32 advances through the inner cylindrical portion 37b of the inner ring 37 of gimbals 33 in the rotor 40 of the motor. Since the erect prism 34 used to compensate for accidental deviation of the optical axis 30 is generally not symmetrical with respect to the optical axis, the rotation of the erect prism at a high speed is not desirable from the viewpoint of dynamic balance. Accordingly, the erect prism 34 is not mounted to the rotor but the stator of the motor.

The inner ring 37 is provided with a balance weight 43 similar to the balance weight 27 shown in FIG. 1. The reference numeral 44 indicates a damper similar to the damper 16a shown in FIG. 2. The magnet 45 mounted to the lens frame 31a and the aluminium member 46 mounted to the rotor 40 are provided for causing a precession effect by creating an eddy current resistance therebetween similarly to the magnet 28 and the aluminium member 29 shown in FIG. 1.

In accordance with the above-described embodiment of the present invention, it is possible to make a very small camera with an optical image stabilizing means. Further, it will be understood that the image stabilizing system in accordance with the above-described embodiment of the invention can be applied to a television camera by placing an image pick-up tube on the focal plane of the objective lens 32. It will also be understood that the image stabilizing system in accordance with the above embodiment can be used as an optical axis stabilizing system for a laser transmitter by incorporating a laser oscillator in the housing 31. It should be noted that the various mechanism required in a photographic camera such as a shutter, diaphragm and the like are all omitted from the description and illustration of the embodiment of the camera shown in FIGS. 3 and 4, since those mechanisms have no significant relationship with the gist of the present invention embodied therein.

Figure 5:
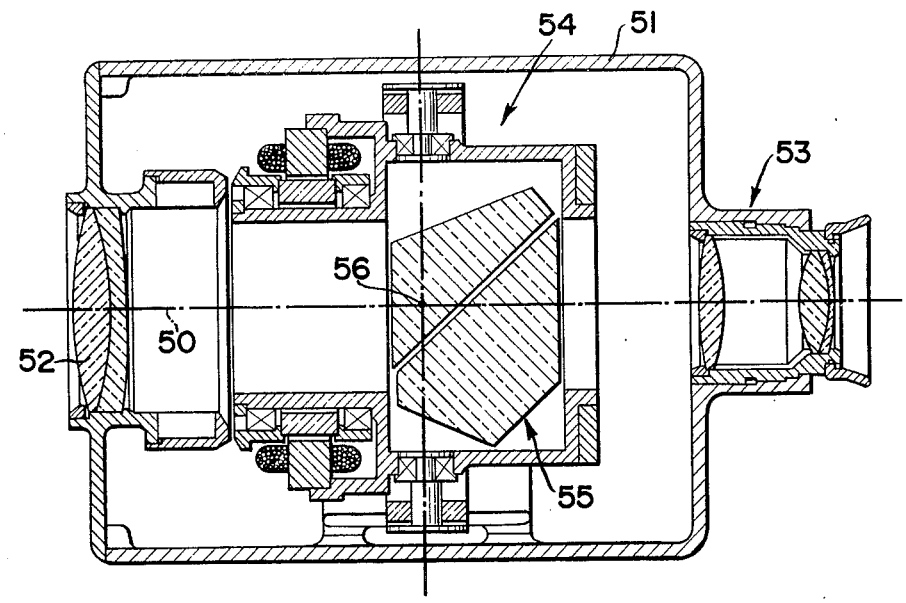
FIG. 5 is a longitudinal sectional elevation of still another embodiment of the optical image stabilizing system in accordance with the present invention embodied in a telescope.

Another embodiment of the present invention embodied in a telescope is illustrated in FIG. 5 in which an eyepiece 53 is mounted to the light-tight housing 51 enclosing an optical image stabilizing mechanism 54 and having at the front end thereof an objective lens 52. The eyepiece 53 is located on the optical axis 50 of the objective lens 52. The image stabilizing mechanism 54 includes an erect prism 55 such as a Pechan prism. The elements employed in this embodiment shown in FIG. 5 which are the same as those employed in the foregoing embodiment shown in FIG. 3 are all illustrated in the same manner as in FIG. 3. Therefore, the construction of the image stabilizing mechanism which is exactly the same as that of the foregoing embodiment will be readily understood to those skilled in the art without a repeated detailed description thereof. The detailed description of those elements such as gimbals and motor is omitted here, accordingly. The center of rotation 56 of the gimbals in this embodiment is selected to be at the middle point of the path from the secondary principal point of the objective lens 52 to the primary principal point of the eyepiece 53. The principle of the effect of stabilization of the optical image viewed through the eyepiece against accidental angular deviation of the telescope by use of the erect prism mounted to gimbals having the center of rotation at the middle point of the path from the secondary principal point to the primary principal point of the eyepiece is described in detail in said copending patent application of the same applicants (Ser. No. 453,440, filed Mar. 21, 1974).

Particularly in the above-described embodiment of the invention shown in FIG. 5, there is a great advantage in that the whole size of the telescope can be made considerably compact in spite of the provision of the image stabilizing means since an erect prism 55 is employed in the optical system of the telescope between the objective lens 52 and the eyepiece 53.

In the foregoing embodiments of the present invention described with reference to FIGS. 1 to 5, the rotor 20, 40 of the motor mounted to gimbals for inertially stabilizing the optical element is annular in shape and rotated around a cylindrical portion 14b, 37b of the inner ring 14, 37 of the gimbals. The rotor 20, 40 is rotatably mounted around the cylindrical portion 14b, 37b by means of ball bearings 19, 39. Therefore, the bearings used for rotatably supporting the annular rotor in the foregoing embodiments are required to have a substantially large diameter. The bearings of large diameter is usually designed for a large load and the weight thereof is also large. Therefore, the motor incorporated in the stabilizing system in accordance with the foregoing embodiments is required to have a large power sufficient to overcome the large load of the bearings. Further, the whole weight of the optical instrument is considerably increased by the large weight of the bearings of large diameter.

In the following embodiments shown in FIGS. 6 to 10, the weight of the bearings is markedly decreased by rotating the annular rotor on a shaft rotatably supported by small bearings. The annular rotor is mounted to a support member fixed to a shaft supported by small bearings. The support member is made of transparent material or arms having a small cross-sectional area so that the light may pass through the support member. By using the support member, the size of the bearings is considerably decreased and the weight thereof is also reduced to a remarkable extent. Since most of the light rays passing through the objective lens pass through the support member which is located apart from the focal plane of the objective lens, the image formation performance of the optical instrument is not markedly ruined by the presence of the shaft and bearings. The bearings are fixed to a pair of transparent end plates which pass the light.

Figure 6:
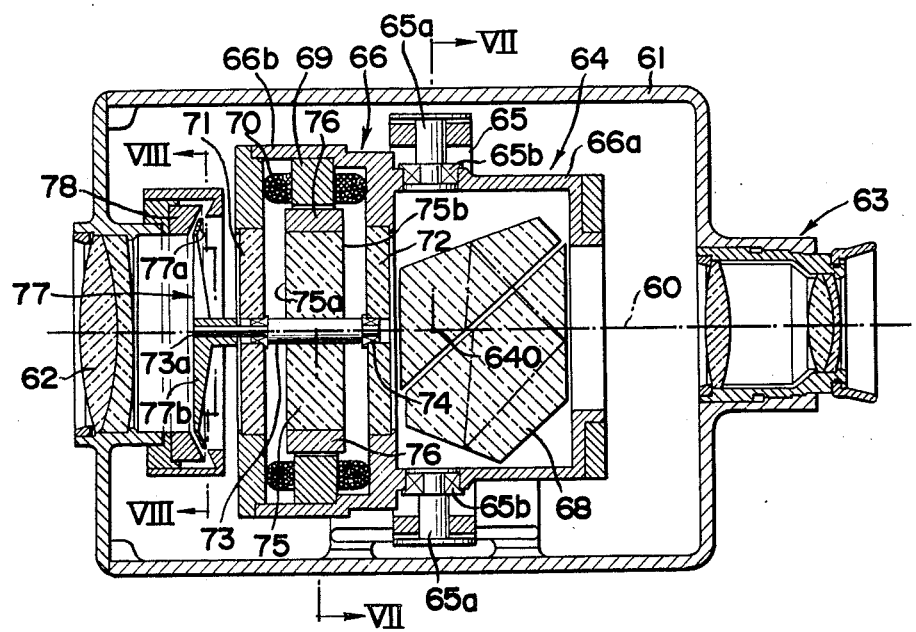
FIG. 6 is a longitudinal sectional elevation of another embodiment of the invention embodied in a telescope in which the rotor of the motor is supported by a transparent member mounted to a shaft.
Figure 7:
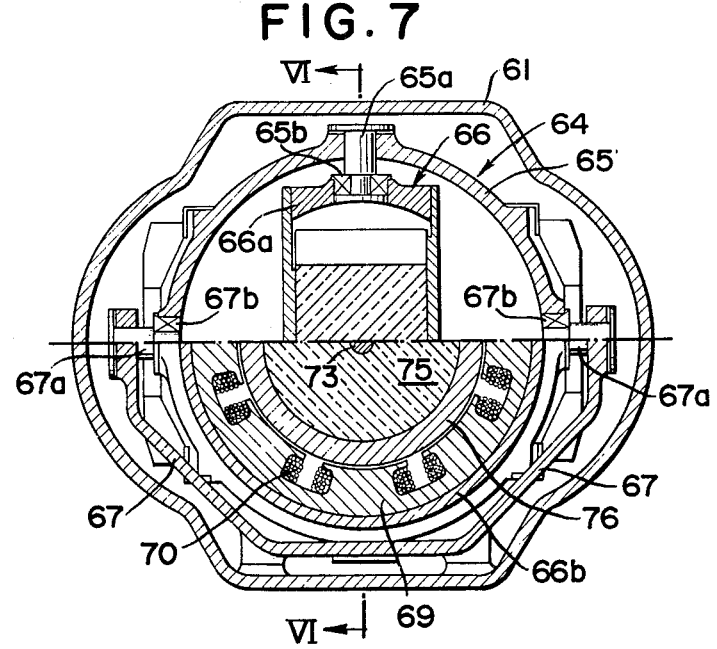
FIG. 7 is a cross-sectional view of the optical image stabilizing system shown in FIG. 6 taken along the line VII—VII.
Figure 8:
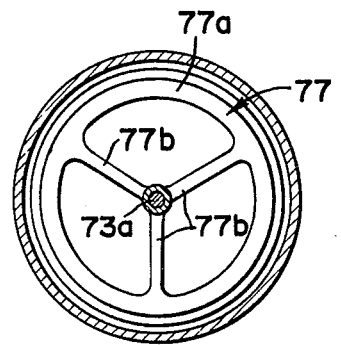
FIG. 8 is a partial view of the optical image stabilizing system shown in FIG. 6 taken along the line VIII—VIII viewed from the direction of the arrows.

One preferred embodiment of the invention of the type as described immediately hereinabove is shown in FIGS. 6 to 8. The embodiment shown in FIGS. 6 to 8 is a telescope in which an objective lens 62 and an eyepiece 63 are mounted to a light-tight housing 61 with the optical axis 60 of the objective lens 62 aligned with the optical axis of the eyepiece 63. Within the housing 61 are disposed gimbals 64 comprising an outer ring 65 and an inner ring 66. The outer ring 65 is rotatably mounted to a pair of support arms 67 fixed to the housing 61 by means of shafts 67a and bearings 67b. The inner ring 66 is rotatably mounted to the outer ring 65 by means of a pair of trunnions 65a and bearings 65b. The center of rotation 640 of the gimbals 64 is set to be at the middle point of the path from the secondary principal point of the objective lens 62 to the primary principal point of the eyepiece 63. The rear portion 66a of the inner ring 66 is provided with an erect prism 68 such as a Pechan prism having its incident light optical axis and its emanating light optical axis 60 of the objective lens 62. The front portion 66b of the inner ring 66 is provided with an annular core 69 having magnetic coils 70 which serves as a stator of an electric motor. The inner ring 66 is further provided with two end plates 71 and 72 extending across the optical axis 60 in perpendicular thereto. The end plates 71 and 72 are made of transparent material and have parallel surfaces. A rotatable shaft 73 is supported by the end plates 71 and 72 by means of a pair of bearings 74 (only one shown in the drawing). The shaft 73 is located with the axis of revolution thereof oriented in alignment with the optical axis 60 of the telescope.

The rotatable shaft 73 is provided with a transparent support member 75 which has parallel flat surfaces 75a and 75b. Around the periphery of the transparent support member 74 is fixed an annular magnetic core 76 serving as a rotor of an electric motor constituted together with said annular core 69 with coils 70 serving as a stator. The stator 69 and the rotor 76 are coaxially positioned as shown in FIG. 7 and the rotor 76 is rotated at a high speed about the optical axis 60 together with the shaft 73. The rotatable shaft 73 has at its front end an extended portion 73a extending forwardly along the axis. The extended portion 73a is provided with a wheel 77 comprising an annular aluminium portion 77a and radially extending support arms 77b connecting the aluminium portion 77a to said portion 73a of the shaft 73 as shown in FIG. 8. The wheel 77 is therefore rotated at a high speed together with the rotor 76. An annular magnet 78 is fixed to the housing 61 at such a position as to be close to said aluminium portion 77a of the wheel 77. The wheel 77 and the magnet 78 constitute a precession means for moving the gimbals or inner ring 66 thereof to follow a large motion of the housing by use of eddy current resistance created between the aluminium portion 77a of the wheel 77 and the magnet 78 when the wheel 77 is rotated in the vicinity of the magnet 78.

In accordance with the above-described embodiment with reference to FIGS. 6 to 8, the rotor 76 is supported by a rotatable shaft which is rotatably held by a pair of small bearings of small weight and load. Therefore, the whole size and weight of the optical instrument can be made small.

In the embodiment described immediately hereinabove with reference to FIGS. 6 to 8, a transparent support member 76 is used to support the annular magnet 76 serving as the rotor. The transparent support member 75 has parallel flat surfaces 75a and 75b. Since the member 75 is rotated at a high speed about the optical axis 60, the surfaces 75a and 75b are required to be precisely processed to have finely finished flat surfaces extending precisely in perpendicular to the optical axis 60. If the surfaces 75a and 75b are short of perfect flatness or preciseness in perpendicularity, the optical axis of the optical instrument will be vibrated with a resulting deterioration in the quality of the optical image obtained by the instrument, i.e. the image viewed through the eyepiece 63.

Figure 9:
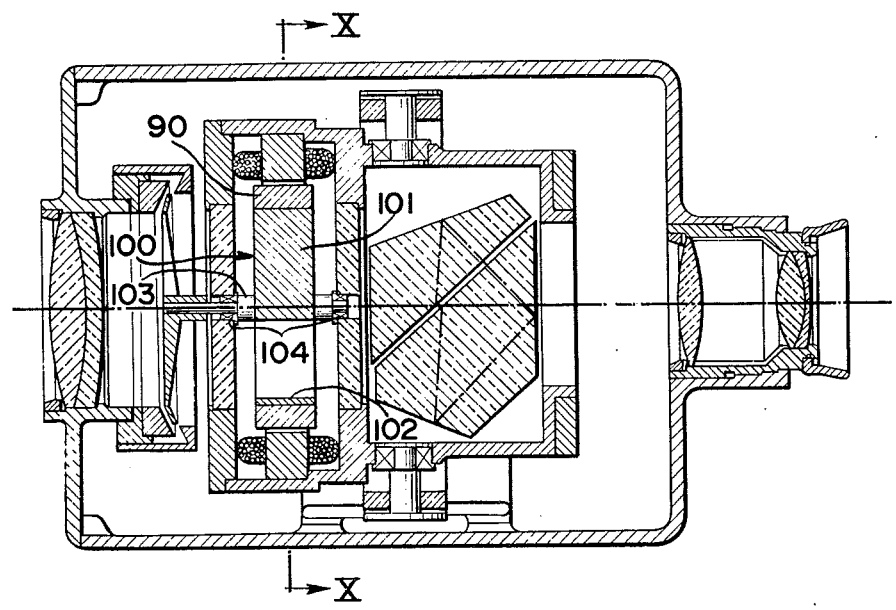
FIG. 9 is a longitudinal sectional elevation of still another embodiment of the present invention embodied in a telescope in which the magnetic rotor serving as an inertial member is supported by arms fixed to a shaft extending along the optical axis of the optical instrument.
Figure 10:
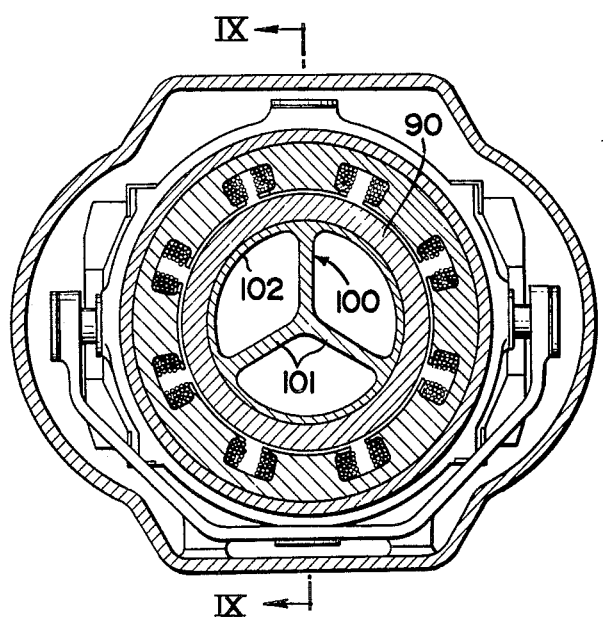
FIG. 10 is a cross-sectional view of the optical image stabilizing system shown in FIG. 9 taken along the line X—X.

Another embodiment of the image stabilizing system in accordance with the present invention in which the problem inherent in the above embodiment of the invention shown in FIGS. 6 to 8 is illustrated in FIGS. 9 and 10. Referring to FIGS. 9 and 10 which shows an embodiment of the invention embodied in a telescope similar to that shown in the above embodiment in FIGS. 6 to 8, those elements that are the same as the elements shown in FIGS. 6 to 8 are not provided with reference numerals and the description thereof is omitted here. The differences between the embodiment shown in FIGS. 6 to 8 and this embodiment shown in FIGS. 9 and 10 lie in the construction of the rotor supporting member which has been indicated as 75 in the former embodiment.

In this embodiment, a rotor 90 in the form of an annular magnet core is fixed to a spoked wheel 100 comprising three spokes 101 and a rim 102. The spoked wheel 100 is fixed to a rotatable shaft 103 supported by a pair of bearings 104 similarly to said rotatable shaft 73 employed in the foregoing embodiment shown in FIGS. 6 to 8. Since the spokes 101 have little cross-sectional area and are located far apart from the focal plane of the objective lens system, the performance of the optical instrument in formation of an optical image is not deteriorated by the presence of the spokes 101 in the way of the light rays from the object lens system to the eyepiece lens system.

In accordance with this embodiment shown in FIGS. 9 and 10, there is no fear of vibration of the optical image viewed through the eyepiece since there is no vibrating surface in the way of the light rays from the objective to the eyepiece. Further, in this embodiment, the weight of the whole instrument is much smaller than that of the instrument of the foregoing embodiment since the transparent support member 75 is replaced by the spoked wheel 100.

We claim:

1. An optical image stabilizing system comprising in combination,
   a housing having an opening for the transmission of light,
   a first stationary optical lens component having a straight line optical axis mounted on said housing for transmission of light passing through said housing opening,
   gimbals mounted in said housing, said gimbals including an inner ring and an outer ring,
   an inertially stabilized second optical component located on said first optical component optical axis, and forming an imaging system with said first optical lens component,
   means for mounting said second optical component on said gimbals inner ring,
   an electric motor including an annular rotor defining an inner space and an annular stator,
   means for rotatably mounting said rotor on said inner ring,
   means for fixedly mounting said stator on said inner ring,
   said rotor providing an inertial means for inertially stabilizing the inner ring of said gimbals,
   said annular rotor being located in enclosing relationship with said first optical lens component optical axis whereby light rays from said first optical lens component may pass through said annular rotor inner space,
   and precession effect means for making said inner ring of the gimbals follow a large motion of said housing,
   said precession effect means comprising an annular magnet fixed to said housing concentrically with said optical axis of said first optical component and an annular member fixed to said rotor concentrically therewith for creating an eddy current resistance between the annular member and said annular magnet when the annular member is rotated together with said rotor.

2. An optical image stabilizing system as defined in claim 1 wherein said second optical component is an erect prism the incident light optical axis and the emanating light optical axis of which are in alignment with each other.

3. An optical image stabilizing system as defined in claim 1 wherein said first optical lens component is a negative lens and said inertially stabilized second optical component is a positive lens to form an afocal lens system together with said negative lens.

4. An optical image stabilizing system as defined in claim 1 wherein said first optical lens component is an objective lens and said second optical component is an erect prism having the incident light optical axis and the emanating light optical axis on the optical axis of said objective lens.

5. An optical image stabilizing system as defined in claim 4 wherein a photographic film is placed on the focal plane of said objective lens.

6. An optical image stabilizing system as defined in claim 4 wherein an eyepiece is mounted to the housing on the optical axis of said objective lens to form a telescopic optical system together with said objective lens.

7. An optical image stabilizing system as defined in claim 1 wherein said annular rotor is rotatably mounted on bearings which are provided in said gimbals, said bearings being annular in shape and located within said annular rotor coaxially therewith.

8. An optical image stabilizing system as defined in claim 1 wherein said annular rotor is mounted to a support member which is fixed to a rotatable shaft extending along the optical axis of said objective lens, said support member having a transparent portion between the annular rotor and the shaft, said shaft being rotatably supported by transparent end plates mounted to gimbals.

9. An optical image stabilizing system as defined in claim 8 wherein said support member is a member made of transparent material and has parallel end faces extending in perpendicular to the optical axis of the first optical component.

10. An optical image stabilizing systtem as defined in claim 8 wherein said support member is a spoked wheel around which said annular rotor is fixed.

11. An optical image stabilizing system as defined in claim 8 wherein said rotatable shaft is rotatably supported by bearings mounted to said end plates.

* * * * *